(12) United States Patent
Lai et al.

(10) Patent No.: US 7,911,240 B1
(45) Date of Patent: Mar. 22, 2011

(54) CLOCK SWITCH-OVER CIRCUITS AND METHODS

(75) Inventors: Gary Lai, Palo Alto, CA (US); Andy L. Lee, San Jose, CA (US); Ryan Fung, Mississauga (CA); Vaughn Betz, Toronto (CA); Marcel A. LeBlanc, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 431 days.

(21) Appl. No.: 11/750,293

(22) Filed: May 17, 2007

(51) Int. Cl.
*G06F 1/08* (2006.01)
(52) U.S. Cl. .......................................... 327/99; 327/298
(58) Field of Classification Search .................... 327/99, 327/298; 326/46, 93–98
See application file for complete search history.

(56) References Cited

U.S. PATENT DOCUMENTS

| | | | | |
|---|---|---|---|---|
| 6,559,679 | B2 * | 5/2003 | Kim | 326/93 |
| 7,068,080 | B1 * | 6/2006 | Sanders | 327/99 |
| 7,109,752 | B1 * | 9/2006 | Schmit et al. | 326/40 |

OTHER PUBLICATIONS

Marcovitz, Alan; Introduction to Logic Design; 2005; McGraw Hill; Second Edition; p. 367.*
"Stratix II Architecture," Altera Corporation, Dec. 2005, pp. 2-1, and 2-53 through 2-57.

* cited by examiner

*Primary Examiner* — Lincoln Donovan
*Assistant Examiner* — John W Poos
(74) *Attorney, Agent, or Firm* — Steven J. Cahill

(57) ABSTRACT

Clock switch-over circuits and methods provide clock signals to clock routing networks. According to one embodiment, a multiplexer selects between a first clock signal and a second clock signal in response to a switch select signal received from a control circuit. A storage circuit stores an enable signal in response to an output clock signal of the multiplexer. A logic circuit transmits the output clock signal of the multiplexer to a clock routing network in response to the enable signal from the storage circuit. At least one signal is transmitted from the clock switch-over circuit to the control circuit.

22 Claims, 8 Drawing Sheets

CLOCK SWITCH-OVER CIRCUITS AND METHODS

BACKGROUND OF THE INVENTION

The present invention relates to electronic circuits, and more particularly, clock switch-over circuits and methods for providing a clock signal to a clock routing network.

Field programmable gate arrays (FPGAs) are programmable logic integrated circuits that contain numerous programmable logic blocks and programmable interconnects. An FPGA user can configure an FPGA after it has been manufactured to implement a variety of different chip designs.

Clock routing networks, which are also known as clock trees, are used in integrated circuits to distribute clock signals. In conventional clock routing networks, input-clock signals are received through dedicated clock-input pins. The clock signals are then distributed through the integrated circuit using a network of lines and drivers.

An FPGA can be configured to implement a design that requires a clock routing network to switch between two different clock signals. The Stratix® II FGPA manufactured by Altera Corporation of San Jose, Calif. has a clock switch-over circuit. The clock switch-over circuit has a clock switch-over multiplexer and a glitch-free mode that uses one enable register to enable or disable a clock signal in response to a core logic signal. However, the clock switch-over circuit cannot be configured to satisfy a specific configuration of a particular FPGA circuit design.

Therefore, it would be desirable to provide a more flexible clock switch-over circuit that can be configured to implement features of particular circuit designs.

BRIEF SUMMARY OF THE INVENTION

The present invention provides clock switch-over circuits and methods that provide clock signals to clock routing networks. According to one embodiment, a multiplexer selects between a first clock signal and a second clock signal in response to a switch select signal received from a control circuit. A storage circuit stores an enable signal in response to an output clock signal of the multiplexer. A logic circuit transmits the output clock signal of the multiplexer to a clock routing network in response to the enable signal from the storage circuit. At least one signal is transmitted from the clock switch-over circuit to the control circuit.

Other objects, features, and advantages of the present invention will become apparent upon consideration of the following detailed description and the accompanying drawings.

DETAILED DESCRIPTION OF THE INVENTION

Figure 1:
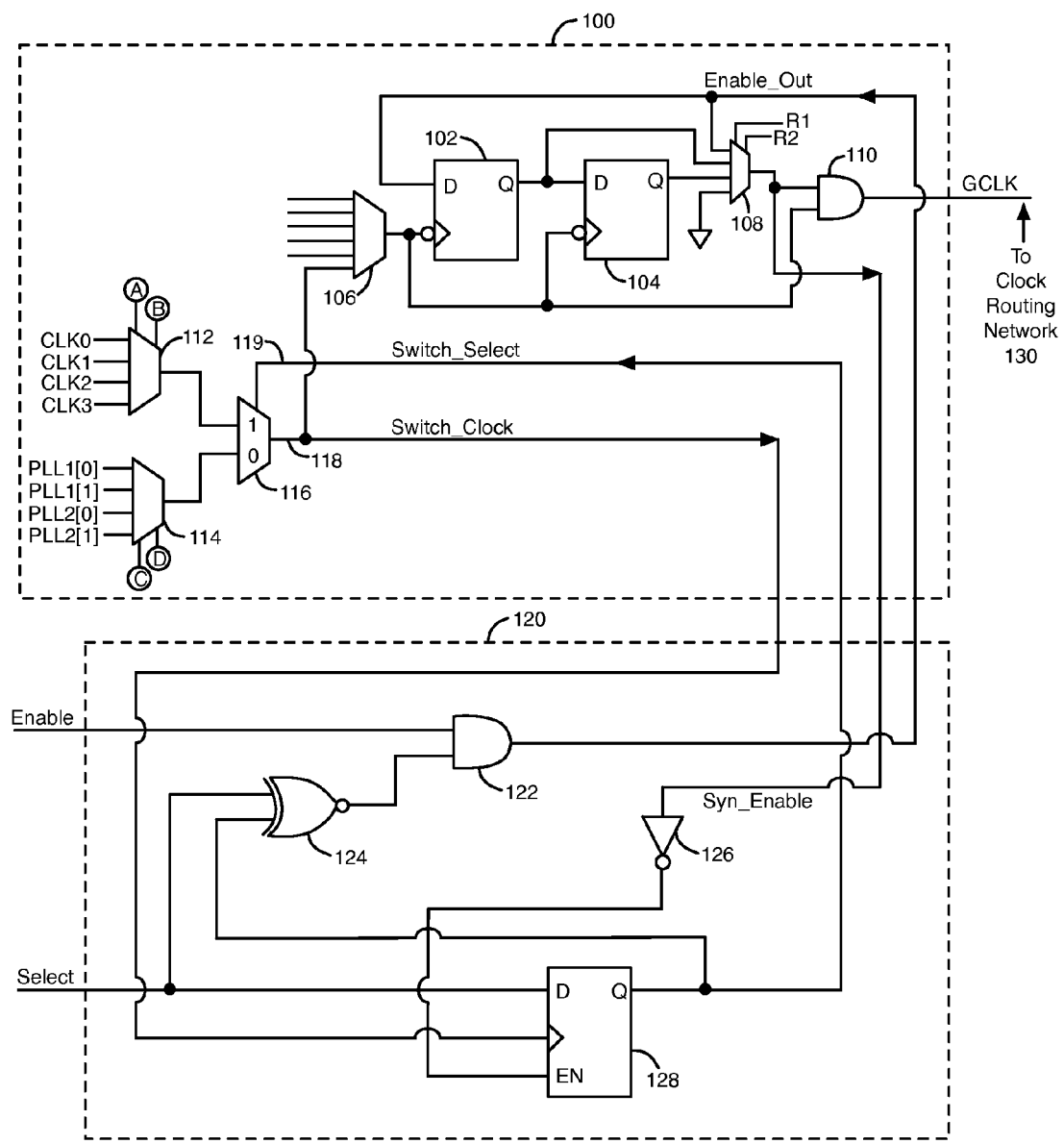
FIG. 1 illustrates examples of a clock switch-over circuit and a control circuit, according to an embodiment of the present invention.

FIG. 1 illustrates a clock switch-over circuit 100 and a control circuit 120, according to a first embodiment of the present invention. Clock switch-over circuit 100 is configured to transmit a clock signal from one of multiple clock sources to a clock routing network on an integrated circuit. Clock switch-over circuit 100 can be included in a programmable logic integrated circuit, an application specific integrated circuit (ASIC), or other type of integrated circuit. Examples of programmable logic integrated circuits include field programmable gate arrays (FPGAs), programmable logic devices (PLDs), and complex programmable logic devices (CPLDs).

Clock switch-over circuit 100 includes flip-flops 102 and 104, multiplexer 106, multiplexer 108, AND gate 110, and multiplexers 112, 114, and 116. Clock switch-over circuit 100 can be hard-wired into a programmable logic integrated circuit so that its structure is not programmable. Alternatively, circuit 100 can be implemented by configuring programmable logic blocks (soft logic) in an FPGA. Although, multiplexer 106 is preferably implemented in hard-wired logic.

Multiplexers 112 and 114 are 4-to-1 multiplexers that are each coupled to receive clock signals from four different sources. The four inputs of multiplexer 112 are coupled to receive four clock signals CLK0, CLK1, CLK2, and CLK3. Clock signals CLK0-3 can be, for example, driven from clock input pins of the integrated circuit. The four inputs of multiplexer 114 are coupled to receive four clock signals PLL1[0], PLL1[1], PLL2[0], and PLL2[1]. Clock signals PLL1[0] and PLL1[1] are driven from a first phase-locked loop (PLL) circuit, and clock signals PLL2[0] and PLL2[1] are driven from a second PLL circuit.

If clock switch-over circuit 100 is on a programmable logic integrated circuit (e.g., an FPGA), multiplexers 112 and 114 are typically configured during a configuration mode. During configuration mode, configuration bits are loaded into the programmable logic integrated circuit to configure programmable logic blocks and programmable connectors.

Multiplexer 112 is configured by configuration bits A and B. Configuration bits A and B determine which of the four input clock signals CLK0-3 multiplexer 112 selects and transmits to its output. Multiplexer 114 is configured by configuration bits C and D. Configuration bits C and D determine which of the four input clock signals PLL1[0-3] multiplexer 114 selects and transmits to its output.

Multiplexer 116 is a 2-to-1 multiplexer. The two inputs of multiplexer 116 are coupled to the outputs of multiplexers 112 and 114. Multiplexer 116 has an output 118 and a select input 119. In the example of FIG. 1, the Switch_Select signal on select input 119 is received from control circuit 120, and the Switch_lock signal at output 118 is transmitted to multiplexer 106 and control circuit 120.

Multiplexer 116 performs the clock switch-over function of clock switch-over circuit 100. The state of the signal at Switch_Select input 119 is set to cause clock switch-over circuit 100 to switch clock routing network 130 from a first clock signal to a second clock signal. Specifically, the logic state of the Switch_Select signal at select input 119 determines whether multiplexer 116 transmits the output clock signal of multiplexer 112 or the output clock signal of multiplexer 114 to output 118 as the Switch-Clock signal. In a programmable logic integrated circuit, the logic state of the Switch_Select signal can be changed during the user mode to cause multiplexer 116 to switch between the clock output signals of multiplexers 112 and 114.

The output 118 of multiplexer 116 is coupled to one of the inputs of multiplexer 106. Multiplexer 106 is shown as a 6-to-1 multiplexer in FIG. 1. It should be understood that multiplexers 106, 112, 114, and 116 can receive any desired number of input signals. The number of input signals that are shown in FIG. 1 for multiplexers 106, 112, 114, and 116 are merely examples that are not intended to limit the scope of the present invention. For example, multiplexer 116 can have 3, 4, or more inputs that receive the same number of input clock signals.

Multiplexer 106 is configured by configuration bits (not shown) during configuration mode to transmit the output signal of multiplexer 116 to clock bar inputs of flip-flops 102 and 104 and an input of AND gate 110. Flip-flops 102 and 104 transmit the signals at their D inputs to their Q outputs in response to a falling clock edge at their clock bar inputs. Multiplexer 106 can also be configured to transmit signals from other sources to flip-flops 102 and 104 in other modes of operation. Flip-flops 102 and 104 are storage circuits.

The D input of flip-flop 102 is coupled to receive an Enable_Out signal from control circuit 120. The Q output of flip-flop 102 is coupled to the D input of flip-flop 104. The Q outputs of flip-flops 102 and 104 are coupled to two inputs of multiplexer 108.

Multiplexer 108 is a 4-to-1 multiplexer. The other two inputs of multiplexer 108 are coupled to the D input of flip-flop 102 and ground. The output of multiplexer 108 is coupled to a second input of AND gate 110. The output signal of AND gate 110 is transmitted to a clock routing network 130 (i.e., a clock tree) on the integrated circuit. Clock routing network 130 can be a global clock network, a regional clock network, a local clock network, or a row clock network on an integrated circuit.

FPGAs and CPLDs typically have multiple global clock routing networks. Each global clock routing network can route a clock signal throughout the chip. Regional and local clock routing networks route clock signals to particular regions of a chip. Row clock routing networks route clock signals to circuit elements in a row of programmable logic blocks.

Clock switch-over circuit 100 can be used to implement many different types of clock switch-over features. For example, clock switch-over circuit 100 can be used to switch a clock routing network from a first clock signal to a back-up clock signal that has an identical frequency and phase as the first clock signal. As another example, clock switch-over circuit 100 can be used to switch between two or more clock signals that have different phases. As yet another example, clock switch over circuit 100 can be used to switch between two or more clock signals that are un-correlated.

Clock switch-over circuit 100 can also be used to implement various meta-stability requirements, for example, by synchronizing the Enable_Out signal with an edge of the clock signal output of multiplexer 106 using one or both of flip-flops 102/104. As yet another example, clock switch-over circuit 100 can be used to switch a clock routing network from one clock signal to another clock signal in a mode that is a latency-free or that has a fixed latency.

A latency-free mode can be implemented, for example, by bypassing flip-flops 102 and 104, as described below. A fixed latency mode can be implemented, for example, by transmitting the Enable_Out signal through one or both of flip-flops 102 and 104, as described below, if the Enable signal is synchronized to the clock signal. Otherwise, the latency may change depending on the precise arrival time of the Enable signal relative to the clock edge. Adding the additional enable register 104 can provide a meta-stability advantage for an asynchronous arrival of the Enable signal. Each of these clock switch-over features typically uses a different control circuit (in place of control circuit 120) to control the operation of clock switch-over circuit 100.

As still another example, clock switch-over 100 can be used to switch a clock routing network between two clock signals without causing a glitch in the clock signal on the clock routing network. Control circuit 120 causes clock switch-over circuit 100 to implement a glitch-free clock switch-over function. Details of the operation of clock switch-over circuit 100 are now described with respect to control circuit 120.

It should be understood that control circuit 120 is merely one example of an application circuit that can control clock switch-over circuit 100, and that a glitch-free mode of clock switch-over is merely one example of an implementation for clock switch-over circuit 100. These examples are not intended to limit the scope of the present invention. Clock switch-over circuit 100 can be used with many other types of applications circuits that cause circuit 100 to implement different types of clock switch-over functions, such as the examples mentioned above.

Control circuit 120 includes AND gate 122, XNOR gate 124, inverter 126, and flip-flop 128. Control circuit 120 can be implemented in soft logic in a programmable logic integrated circuit by configuring programmable logic blocks in the core programmable logic of an FPGA or PLD. Alternatively, control circuit 120 can be implemented in hard-wired logic.

Control circuit 120 receives an asynchronous Enable input signal and an asynchronous Select input signal, as shown in FIG. 1. The Enable and Select signals can be generated, for example, by other circuits elements on the integrated circuit, or they can be driven from an external source to an input pin. The Enable signal is transmitted to a first input of AND gate 122. The Select signal is transmitted to a first input of XNOR gate 124 and the D input of flip-flop 128.

The output of XNOR gate 124 is coupled to the second input of AND gate 122. The output of AND gate 122 is coupled to D input of flip-flop 102 and an input of multiplexer 108. AND gate 122 generates the Enable_Out output signal. The Syn_Enable output signal of multiplexer 108 is inverted by inverter 126 and then transmitted to an enable (EN) input of flip-flop 128. The output 118 of multiplexer 116 is coupled to a clock input of flip-flop 128.

XNOR gate 124 performs a Boolean logic function. The output signal of XNOR gate 124 is a logic high when the Select signal and the Switch_Select output signal of flip-flop 128 are both in logic low states or both in logic high states. The output signal of XNOR gate 124 is a logic low when its input signals are in different logic states.

Multiplexer 108 receives two signals R1 and R2 at select inputs. Signals R1 and R2 control multiplexer 108. Multiplexer 108 couples one of its inputs to its output in response to the logic states of signals R1 and R2. R1 and R2 can be configuration bits that configure multiplexer 108 during configuration mode.

Multiplexer 108 can be configured to couple ground to an input of AND gate 110 so that AND gate 110 blocks circuit 100 from transmitting a clock signal to the clock routing network 130.

Multiplexer 108 can also be configured to transmit the Enable_Out signal from AND gate 122 directly to an input of AND gate 110 and inverter 126. A description is now provided regarding the operation of circuit 100 when multiplexer 108 couples Enable_Out directly to inputs of AND gate 110 and inverter 126.

The Select signal is transmitted to inputs of flip-flop 128 and XNOR gate 124. The logic state of the Select signal is changed to initiate a clock switch-over function. When the Select signal changes logic states, the Switch_Select output signal of flip-flop 128 is in a different logic state than the Select signal. As a result, the output signal of XNOR gate 124 and the Enable_Out output signal of AND gate 122 are logic lows, causing the Syn_Enable output signal of multiplexer 108 to also be low.

When the Syn_Enable output signal of multiplexer 108 is low, AND gate 110 is disabled from transmitting a clock signal from multiplexer 106 to clock routing network 130, and the output signal of inverter 126 is high. When the output signal of inverter 126 is high, flip-flop 128 is enabled. When flip-flop 128 is enabled, flip-flop 128 transmits the state of the Select signal to its Q output after the next rising edge of the Switch_Clock output signal of multiplexer 116.

After the Select signal transitions from a logic low to a logic high, and flip-flop 128 has been enabled, the Switch_Select output signal of flip-flop 128 transitions high. In response to a high on the Switch_Select signal, multiplexer 116 transmits the output clock signal of multiplexer 112 to AND gate 110 through multiplexer 106.

When the Select signal and the Switch_Select signal are in logic high states, the output signal of XNOR gate 124 is high. When the Enable signal and the output signal of XNOR gate 124 are high, the Enable_Out output signal of AND gate 122 is high. When the Enable_Out signal transitions to a logic high, the output signal of multiplexer 108 transitions to a logic high state, causing AND gate 110 to enable transmission of the clock output signal of multiplexer 106 to clock routing network 130. The clock switch-over from the output clock signal of multiplexer 114 to the output clock signal of multiplexer 112 is then complete.

After the Select signal transitions from a logic high to a logic low, and flip-flop 128 has been enabled, the Switch_Select output signal of flip-flop 128 transitions low. In response to a low on the Switch_Select signal, multiplexer 116 transmits the clock output signal of multiplexer 114 to AND gate 110 through multiplexer 106.

When the Select signal and the Switch_Select signal are both low, the output signal of XNOR gate 124 is high. When the Enable signal and the output signal of XNOR gate 124 are high, the Enable_Out output signal of AND gate 122 is high. When the Enable_Out signal transitions to a logic high, the output signal of multiplexer 108 transitions to a logic high state, causing AND gate 110 to enable transmission of the clock output signal of multiplexer 106 to clock routing network 130. The clock switch-over from the output clock signal of multiplexer 112 to the output clock signal of multiplexer 114 is then complete.

A glitch can occur in the clock signal GCLK transmitted on clock routing network 130 if circuit 100 switches between two different clock signals without considering their logic low and logic high times. A glitch high pulse has a width that is less than the smallest width of the high pulse in both clock signals. A glitch low pulse has a width that is less than the smallest width of the low pulse in both clock signals. When flip-flop 102 is coupled into clock switch-over circuit 100, the clock switch-over process may begin when the first clock signal on network 130 is low. Flip-flop 102 also prevents a second clock signal from being transmitted to network 130 until the second clock signal has a falling transition. As a result, flip-flop 102 prevents glitches from occurring on the clock signal GCLK transmitted on network 130.

Signals R1 and R2 can also be set to cause multiplexer 108 to couple the Q output of flip-flip 102 to an input of AND gate 110. A description is now provided regarding the operation of circuit 100 when multiplexer 108 couples the Q output of flip-flop 102 to inputs of AND gate 110 and inverter 126.

When the Select signal changes state to initiate the clock switch-over process, the Switch_Select output signal of flip-flop 128 is in a different logic state than the Select signal, and the output signals of XNOR gate 124 and AND gate 122 are logic lows. The output of AND gate 122 is also coupled to the D input of flip-flop 102.

After the Enable_Out output signal of AND gate 122 transitions low, flip-flop 102 transmits the low Enable_Out signal to its Q output after the next falling edge of the output clock signal of multiplexer 106. When the Q output of flip-flop 102 is low, the Syn_Enable output signal of multiplexer 108 is also low. While the Syn_Enable signal is low, AND gate 110 is disabled from transmitting a clock signal from multiplexer 106 to clock routing network 130. Flip-flop 102 prevents glitches on clock routing network 130 by ensuring that AND gate 110 is disabled when the clock signal from multiplexer 106 is low.

Also, flip-flop 128 is enabled after the Syn_Enable signal transitions low. When flip-flop 128 is enabled, flip-flop 128 transmits the state of the Select signal to its Q output after the next rising edge of the Switch_Clock signal from multiplexer 116.

After the Select signal transitions from a logic low to a logic high, and flip-flop 128 has been enabled, the Switch_Select output signal of flip-flop 128 changes to a logic high, causing multiplexer 116 to transmit the clock output signal of multiplexer 112 to AND gate 110 through multiplexer 106. When the Switch_Select signal and the Select signal are in logic high states, the output signal of XNOR gate 124 is in a logic high state. When the Enable signal and the output signal of XNOR gate 124 are both high, the Enable_Out signal from AND gate 122 is high. After the Enable_Out signal transitions high, flip-flop 102 transmits the high Enable_Out signal from its D input to its Q output after the next falling edge of the output clock signal of multiplexer 106. When the Q output signal of flip-flop 102 is high, multiplexer 108 enables AND gate 110 to transmit the clock output signal of multiplexer 106 to clock routing network 130, completing the clock switch-over.

In order for control circuit 120 to function, the Switch_Select signal should change state so that the second clock signal is selected before the Enable_Out signal changes state. Otherwise, AND gate 110 might be enabled by a falling edge of the first clock signal, and when the second clock signal is selected, there may be a glitch in output clock signal GCLK. To provide the proper timing, latency can be added from circuit 120 to circuit 100, either by inserting logic and/or routing delay, or by adding registers after AND gate 122. This latency can be provided in either circuit 100 or circuit 120.

This timing relationship also applies when the clock switch-over circuit can switch between more than 2 clock signals. For example, a clock switch-over circuit of the present invention can have more than 2 multiplexers 112 and 114 and more than 1 Switch_Select signal. In these embodiments, all the Switch_Select signals arrive at multiplexer 116 some time before the output clock signal GCLK is re-enabled by the Enable_Out signal. However, it is possible that multiplexer 116 may end up selecting neither the first clock signal nor the second clock signal for a short time before it stabilizes.

After the Select signal transitions from a logic high to a logic low, and flip-flop 128 has been enabled, the Switch_Select output signal of flip-flop 128 changes to a logic low, causing multiplexer 116 to transmit the clock output signal of multiplexer 114 to AND gate 110 through multiplexer 106. When the Switch_Select signal and the Select signal are in logic low states, the output signal of XNOR gate 124 is in a logic high state. When the Enable signal and the output signal of XNOR gate 124 are both high, the Enable_Out signal from AND gate 122 is high. After the Enable_Out signal transitions high, flip-flop 102 transmits the high Enable_Out signal from its D input to its Q output after the next falling edge of the output clock signal of multiplexer 106. When the Q output signal of flip-flop 102 is high, multiplexer 108 enables AND gate 110 to transmit the clock output signal of multiplexer 106 to clock routing network 130, completing the clock switch-over.

Flip-flop 102 ensures that the clock signal from the newly selected clock source is transmitted to clock routing network 130 when that clock signal is low to prevent a glitch. Flip-flop 102 synchronizes the disabling and subsequent enabling of AND gate 110 to the falling edges of the clock signal selected by multiplexer 106 to prevent glitches on clock routing network 130. Control circuit 120 can control circuit 100 to implement a glitch free clock switch-over on network 130 without having to determine the phase or frequency relationship between the output clock signals of multiplexers 112 and 114. Flip-flop 102 also delays the clock switch-over process.

Signals R1 and R2 can also be set to cause multiplexer 108 to couple the Q output of flip-flip 104 to an input of AND gate 110. A description is now provided regarding the operation of clock switch-over circuit 100 when multiplexer 108 couples the Q output of flip-flop 104 to inputs of AND gate 110 and inverter 126. When the Select signal changes state to initiate the clock switch-over process, the Switch_Select output signal of flip-flop 128 is in a different logic state than the Select signal, and as a result, the output signals of XNOR gate 124 and AND gate 122 are logic lows.

The output of AND gate 122 is coupled to the D input of flip-flop 102. After the Enable_Out output signal of AND gate 122 transitions low, flip-flop 102 transmits the low Enable_Out signal to the D input of flip-flop 104 after the next falling edge in the clock output signal of multiplexer 106. After a second falling edge in the clock output signal of multiplexer 106, flip-flop 104 transmits the low signal to its Q output and an input of multiplexer 108. When the Q output signal of flip-flop 104 is low, the Syn_Enable output signal of multiplexer 108 is also low. When the Syn_Enable signal transitions low, AND gate 110 is disabled from transmitting a clock signal from multiplexer 106 to clock routing network 130. Flip-flops 102 and 104 prevent glitches on clock routing network 130 by ensuring that AND gate 110 is disabled when the clock signal from multiplexer 106 is low.

Flip-flop 128 is enabled after the Syn_Enable signal transitions low. When flip-flop 128 is enabled, flip-flop 128 transmits the state of the Select signal to its Q output after the next rising edge of the Switch_Clock output signal of multiplexer 116.

After the Select signal transitions from a logic low to a logic high, and flip-flop 128 has been enabled, the Switch_Select output signal of flip-flop 128 changes to a logic high, causing multiplexer 116 to transmit the clock output signal of multiplexer 112 to AND gate 110 through multiplexer 106. When the Switch_Select signal and the Select signal are in logic high states, the output signal of XNOR gate 124 is a logic high. When the Enable signal and the output signal of XNOR gate 124 are high, the Enable_Out output signal of AND gate 122 is high.

After the Enable_Out signal transitions high, flip-flop 102 transmits the high Enable_Out signal from its D input to the D input of flip-flop 104 after the next falling edge of the output clock signal of multiplexer 106. After a second falling edge of the output clock signal of multiplexer 106, flip-flop 104 transmits the high signal from its D input to an input of multiplexer 108. The Syn_Enable output signal of multiplexer 108 then transitions high, enabling AND gate 110 to transmit the clock output signal of multiplexer 106 to clock routing network 130, completing the clock switch-over process.

After the Select signal transitions from a logic high to a logic low, and flip-flop 128 has been enabled, the Switch_Select output signal of flip-flop 128 transitions to a logic low, causing multiplexer 116 to transmit the clock output signal of multiplexer 114 to AND gate 110 through multiplexer 106. When the Switch_Select signal and the Select signal are in logic low states, the output signal of XNOR gate 124 is in a logic high state. When the Enable signal and the output signal of XNOR gate 124 are both high, the Enable_Out signal from AND gate 122 is high.

After the Enable_Out signal transitions high, flip-flop 102 transmits the high Enable_Out signal from its D input to the D input of flip-flop 104 after the next falling edge of the clock output signal of multiplexer 106. After a second falling edge of the clock output signal of multiplexer 106, flip-flop 104 transmits the high signal from its D input to an input of multiplexer 108. The Syn_Enable output signal of multiplexer 108 then transitions high, enabling AND gate 110 to transmit the clock output signal of multiplexer 106 to clock routing network 130, completing the clock switch-over process.

Flip-flops 102 and 104 ensure that the clock signal from the newly selected clock source is transmitted to clock routing network 130 when that clock signal is low to prevent a glitch. Flip-flops 102 and 104 synchronize the disabling and subsequent enabling of AND gate 110 to the falling edges of the clock output signal of multiplexer 106 to prevent glitches on clock routing network 130 during clock switch-over. Also, flip-flops 102 and 104 delay the clock switch-over process. Register 104 can provide a meta-stability advantage for an asynchronous arrival of the Enable signal.

Figure 2:
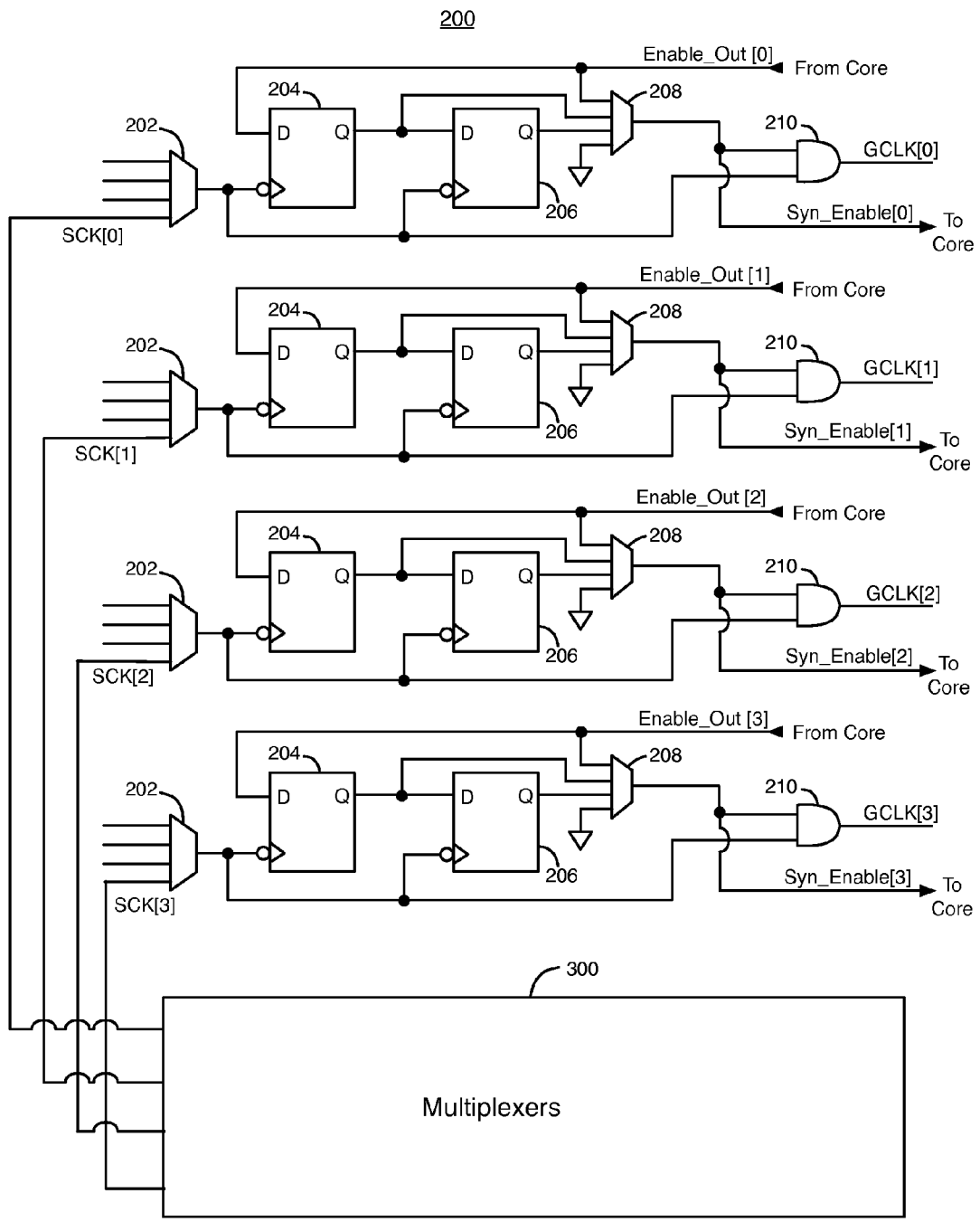
FIG. 2 illustrates other examples of clock-switch over circuits, according to additional embodiments of the present invention.

FIG. 2 illustrates other examples of clock-switch over circuits, according to additional embodiments of the present invention. Circuit 200 shown in FIG. 2 includes four clock switch-over circuits. Each of the four clock switch-over circuits includes a multiplexer 202, a flip-flop 204, a flip-flop 206, a multiplexer 208, and an AND gate 210. Flip-flops 204 and multiplexers 208 receive enable signals Enable_Out [0-3] from a control circuit in the core logic of the integrated circuit. The output signals Syn_Enable [0-3] of multiplexers 208 are transmitted to AND gates 210 and the control circuit in the core logic of the integrated circuit. The control circuit can, for example, be implemented in soft programmable logic in an FPGA. Alternatively, the control circuit can be hardwired into the chip.

Each of the clock switch over circuits of FIG. 2 functions as described above with respect to clock switch-over circuit 100. The clock switch-over circuits of FIG. 2 can implement numerous different clock switch-over processes, including any of the clock switch-over processes described above.

Figure 3:
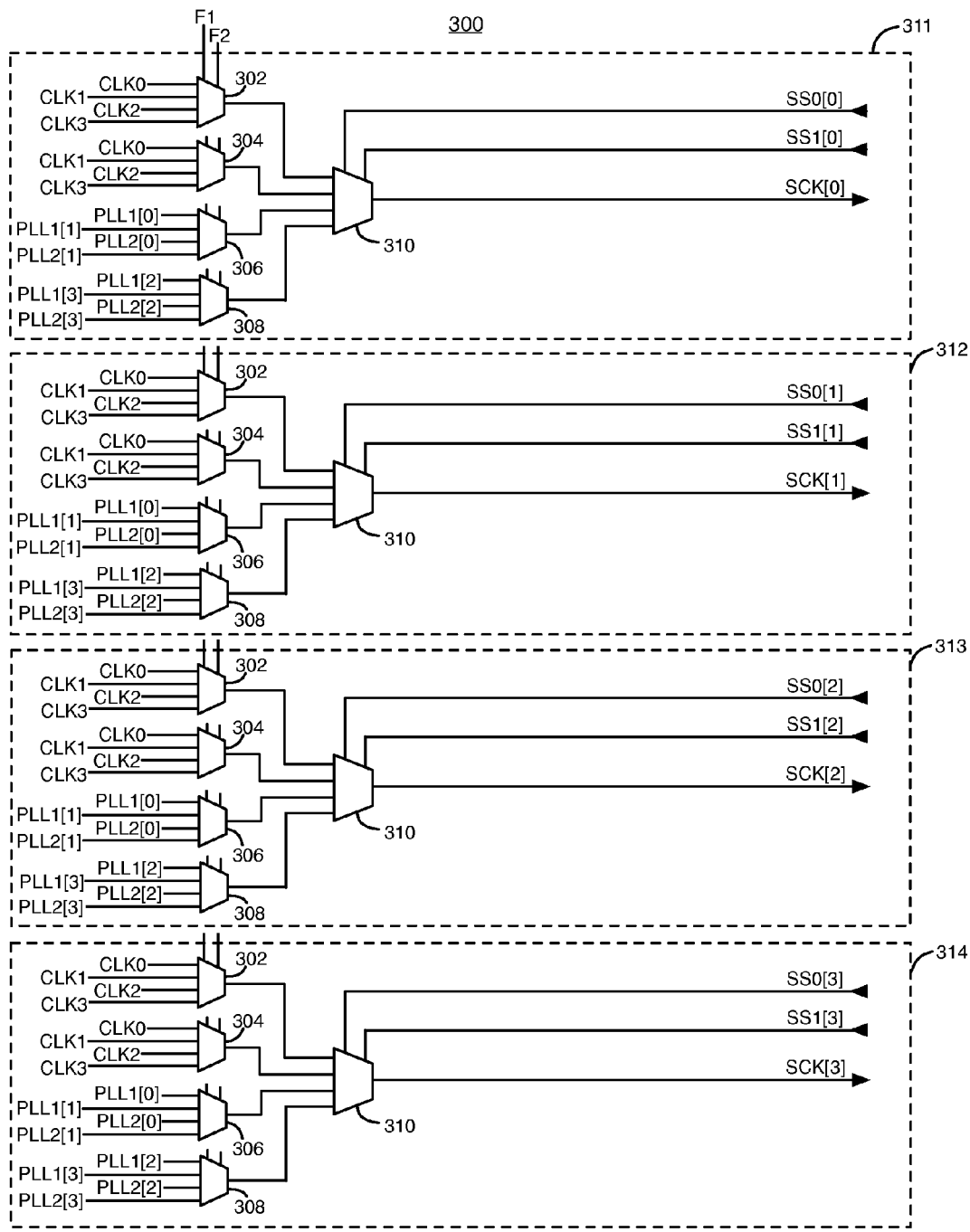
FIG. 3 illustrates examples of multiplexers that can be used with the clock switch-over circuits of FIG. 2 to switch between clock signals, according to further embodiments of the present invention.

Multiplexers 202 in the four clock switch-over circuits of FIG. 2 receive clock signals SCK[0-3] from multiplexers 300. Multiplexers 300 are shown in further detail in FIG. 3. Multiplexers 300 include four sets of multiplexers 311, 312, 313, and 314. Each set of multiplexers 311-314 transmits a clock signal SCK[0-3] from a clock source to one of the clock switch-over circuits shown in FIG. 2.

Each set of multiplexers 311-314 includes multiplexers 302, 304, 306, 308, and 310. Multiplexer 302 is configured to select one of four different clock signals CLK0, CLK1, CLK2, or CLK3 from four different clock sources. Multiplexer 304 is also configured to select one of four different clock signals CLK0, CLK1, CLK2, or CLK3 from four different clock sources. Clock signals CLK0, CLK1, CLK2, and CLK3 can, for example, be transmitted from external sources through input pins. Typically, multiplexer 302 is configured to select a different clock signal from among clock signals CLK0-3 than multiplexer 304.

Multiplexer 306 is configured to select one of four different clock signals PLL1[0], PLL1[1], PLL2[0], and PLL2[1]. PLL1[0] and PLL1[1] are first and second output signals of a first phase-locked loop (PLL), and PLL2[0] and PLL2[1] are first and second output signals of a second PLL. Multiplexer 308 is configured to select one of four different clock signals PLL1[2], PLL1[3], PLL2[2], and PLL2[3]. PLL1[2] and PLL1[3] are third and fourth output signals of the first PLL, and PLL2[2] and PLL2[3] are third and fourth output signals of the second PLL.

Multiplexers 302, 304, 306, and 308 in circuits 311-314 are typically configured by configuration bits during configuration mode. For example, multiplexer 302 in circuit 311 is configured by configuration bit signals F1 and F2. Each of multiplexers 302, 304, 306, and 308 is configured to select a clock signal from a different clock source during configuration mode. Then, during user mode, multiplexer 310 is controlled to select a clock signal from the output of one of multiplexers 302, 304, 306, and 308.

Multiplexers 310 in circuits 311-314 are controlled by select signals SS0[0] and SS1[0], SS0[1] and SS1[1], SS0[2] and SS1[2], and SS0[3] and SS1[3]. These select signals are generated by a control circuit. The control circuit can change the states of the select signals SS0 and SS1 to cause multiplexer 310 to switch the clock routing network from receiving a first clock signal from first clock source to receiving a second clock signal from a second clock source. The select signals cause multiplexer 310 to select one of four different clock signals from the outputs of multiplexers 302, 304, 306, and 308.

The output signals SCK[0-3] of multiplexers 310 are routed to the inputs of multiplexers 202 in FIG. 2, and from multiplexers 202 to AND gates 210. The clock routing networks are coupled to receive global clock signals GCLK[0-3] from the outputs of AND gates 210.

Figure 4:
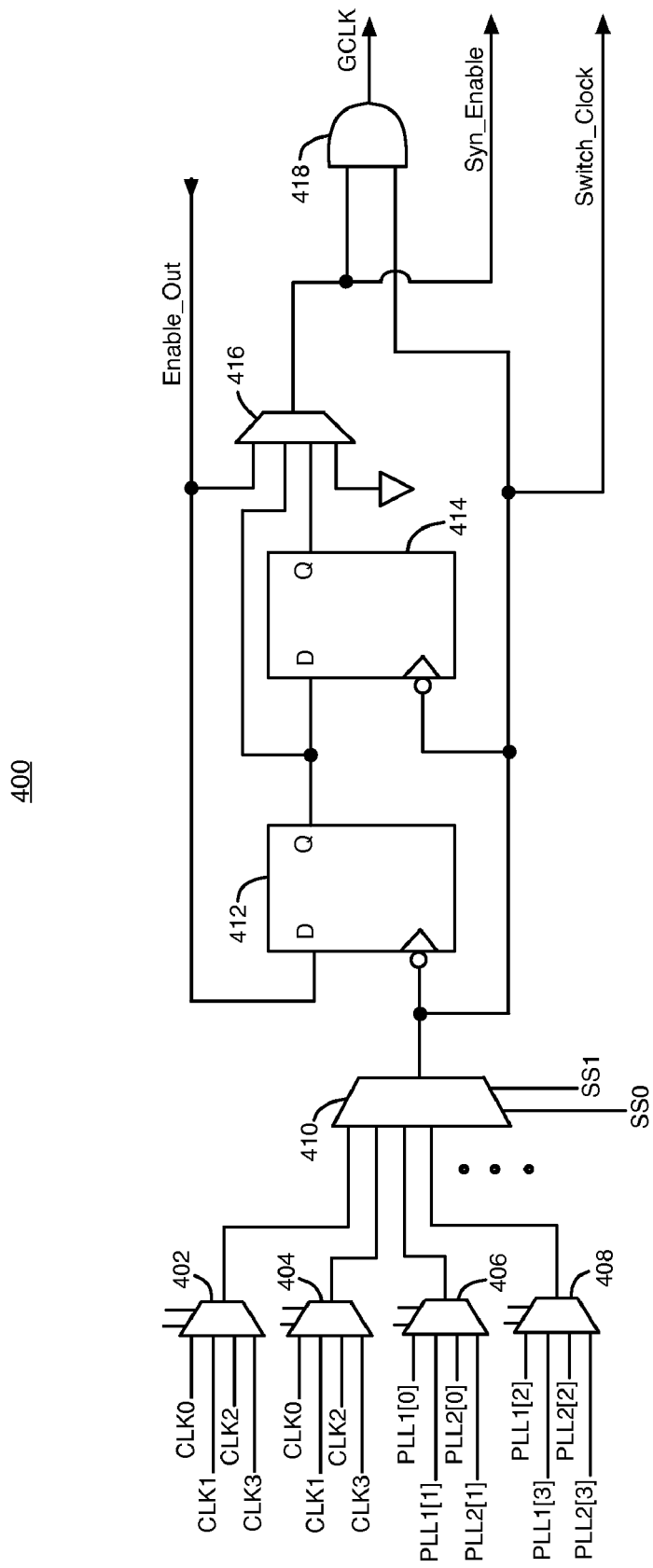
FIG. 4 illustrates an example of a more tightly integrated clock switch over circuit, according to another embodiment of the present invention.

FIG. 4 illustrates a more tightly integrated clock switch over circuit 400, according to another embodiment of the present invention. In clock switch over circuit 400, multiplexer 410 replaces multiplexers 106 and 116 in FIG. 1. Multiplexer 410 is a 4-to-1 or larger multiplexer. Multiplexer 410 can also be replaced with a 3-to-1 multiplexer. Inputs of multiplexer 410 are coupled to the outputs of 4 or more multiplexers 402, 404, 406, 408, etc.

Multiplexers 402, 404, 406, 408, etc. are configured by configuration bits during configuration mode to select a particular clock signal. Multiplexer 410 receives two switch select signals SS0 and SS1 from a control circuit (not shown). The states of the switch select signals SS0 and SS1 determine which clock signal multiplexer 410 selects as the Switch_Clock output signal. The Switch_Clock output signal is transmitted to the clock inputs of flip-flops 412 and 414 and an input of AND gate 418. The Switch_Clock signal is also transmitted to the control circuit.

Flip-flops 412 and 414 store the Enable_Out signal from the control circuit to prevent glitches on output clock signal GCLK, as described above. Multiplexer 416 transmits the Enable_Out signal, the Q output signal of flip-flop 412, the Q output signal of flip-flop 414, or ground to the other input of AND gate 418 as the Syn_Enable signal. The Syn_Enable signal is also transmitted to the control circuit. The output signal of AND gate 418 is a clock signal GCLK that is driven to a clock routing network.

Figure 5:
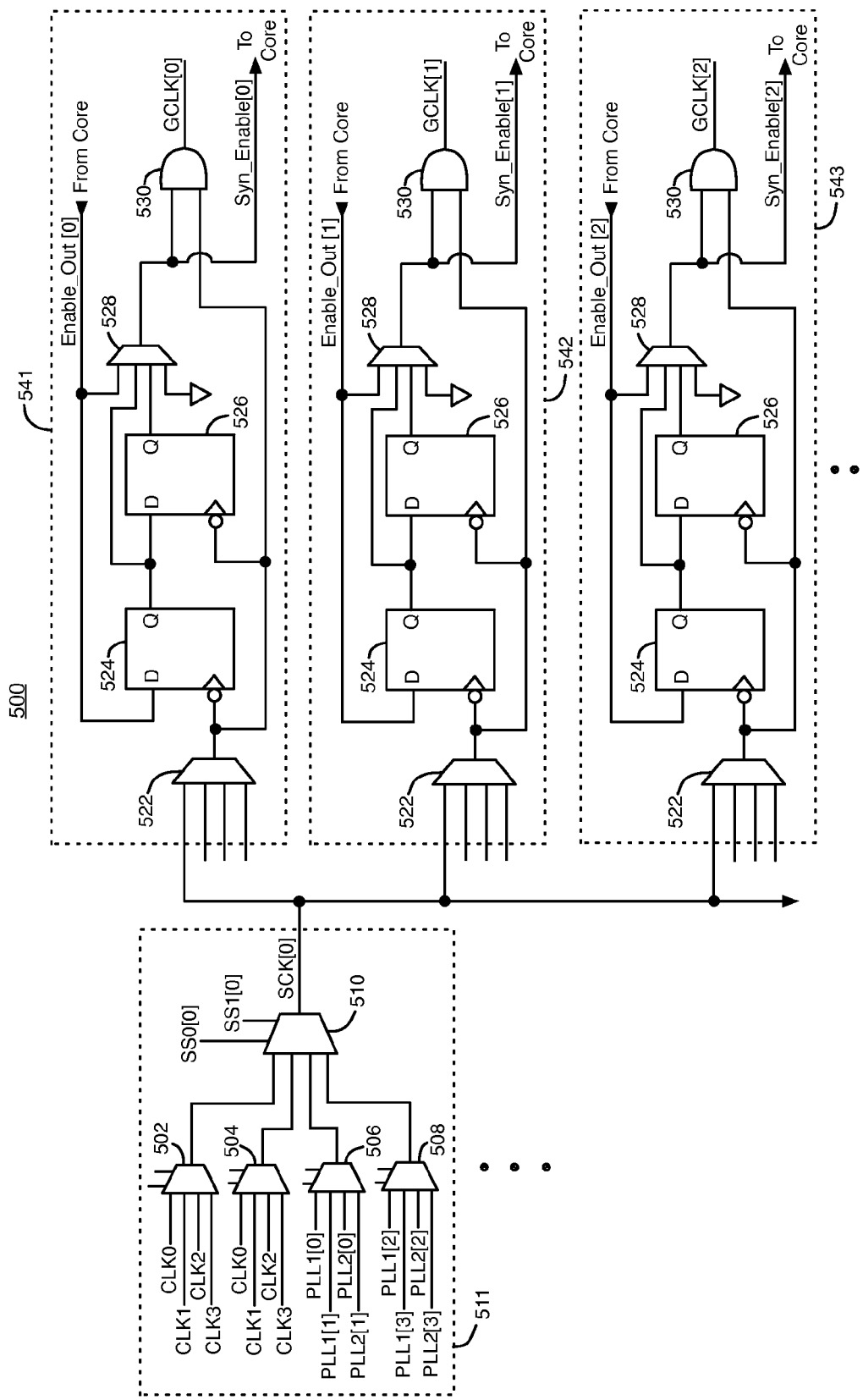
FIG. 5 illustrates another example of a clock switch over circuit, according to another embodiment of the present invention.

FIG. 5 illustrates another clock switch-over circuit 500, according to another embodiment of the present invention. Clock switch over circuit 500 includes one or more multiplexer blocks 511. Each multiplexer block 511 includes multiplexers 502, 504, 506, 508, and 510. Multiplexers 502, 504, 506, and 508 are configured during configuration mode to transmit a particular clock signal to an input of multiplexer 510. In response to the states of the corresponding select signals SS0 and SS1, each multiplexer 510 selects a clock output signal from one of multiplexers 502, 504, 506, or 508 during user mode as the switch clock output signal SCK.

Clock switch over circuit 500 also includes two or more circuit blocks 541, 542, 543, etc. Each circuit block 541-543, etc. includes a multiplexer 522, flip-flops 524 and 526, multiplexer 528, and AND gate 530. The number N of circuit blocks 541, 542, 543, etc. is greater than the number M of multiplexer blocks 511 in clock switch-over circuit 500 (N>M).

The switch clock output signal SCK[0] from multiplexer 510 in the first multiplexer block 511 is transmitted to a first input of multiplexer 522 in circuit blocks 541, 542, 543, etc. If clock switch-over circuit 500 has two or more multiplexer blocks 511, the output clock signals of the additional multiplexers 510 can be transmitted to additional inputs of multiplexers 522 in circuit blocks 541, 542, 543, etc. Multiplexer 522 is configured during configuration mode or during user mode to transmit one of its clock input signals to the clock inputs of flip-fops 524 and 526 and to an input of AND gate 530. Circuit block 541, 542, 543, etc. can be configured to transmit different clock signals to their respective clock routing networks by providing different sets of select signals to each of the multiplexers 522.

Flip-flops 524 and 526 store an Enable_Out signal from a control circuit to prevent glitches on clock output signal GCLK, as described above. Multiplexer 528 selects the Enable_Out signal, the Q output signal of flip-flop 524, the Q output signal of flip-flop 526, or ground as the Syn_Enable signal. The Syn_Enable signal is transmitted to AND gate 530 and to a control circuit. AND gate 530 transmits the clock output signal of multiplexer 522 to a clock routing network when the Syn_Enable signal goes high. The output signal of AND gate 530 is the clock signal GCLK that is transmitted to the clock routing network.

Figure 6:
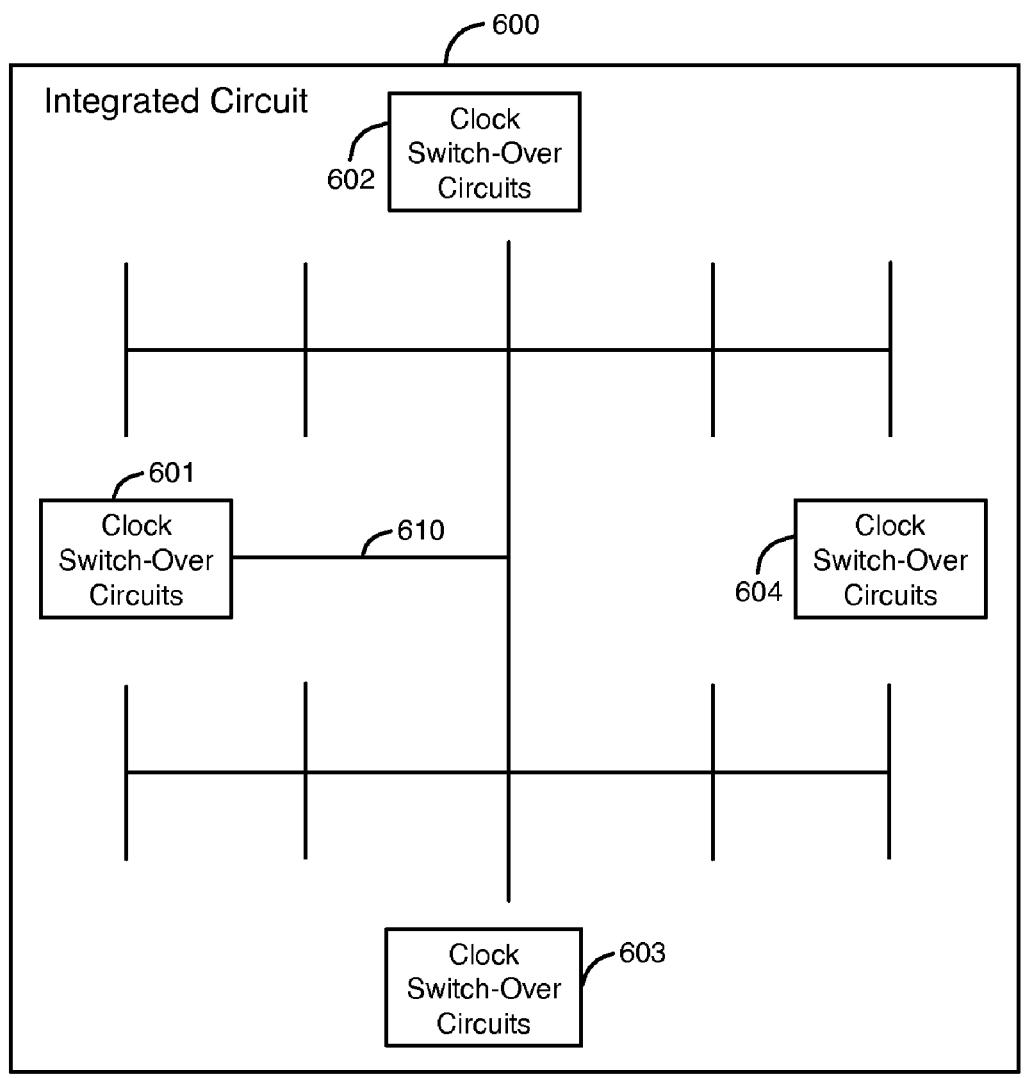
FIG. 6 illustrates an example of an integrated circuit that includes four sets of clock switch-over circuits, according to an embodiment of the present invention.

FIG. 6 illustrates an example of an integrated circuit 600 that includes four sets of clock switch-over circuits, according to an embodiment of the present invention. Integrated circuit 600 can be, for example, a programmable logic integrated circuit or an application specific integrated circuit. Integrated circuit 600 includes clock switch-over circuits 601, clock switch-over circuits 602, clock switch-over circuits 603, and clock switch-over circuits 604.

Each set 601-604 of the clock switch over circuits can, for example, include any of the clock switch-over circuits shown in FIGS. 1-5. FIG. 6 illustrates one example of a clock routing network 610 that receives a clock signal from one of the clock switch-over circuits in block 601. Clock routing network 610 routes the clock signal from one of the clock switch-over circuits in block 601 to circuit elements in various regions of integrated circuit 600.

Figure 7:
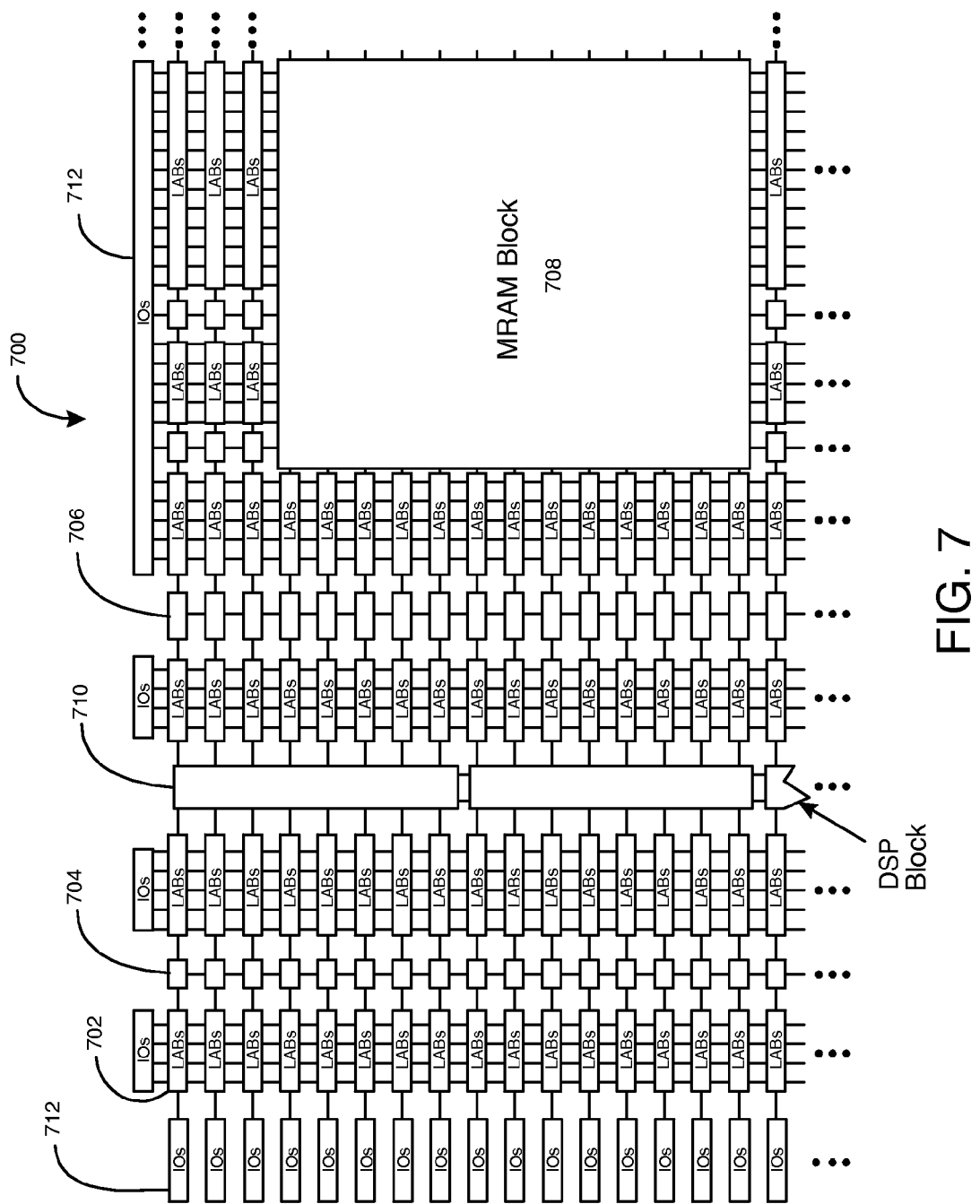
FIG. 7 is a simplified block diagram of a field programmable gate array (FPGA) that can embody the techniques of the present invention.

FIG. 7 is a simplified partial block diagram of an FPGA 700 that can include aspects of the present invention. FPGA 700 is merely one example of an integrated circuit that can include features of the present invention. It should be understood that clock switch-over circuits and methods of the present invention can be used in numerous types of integrated circuits such as field programmable gate arrays (FPGAs), programmable logic devices (PLDs), complex programmable logic devices (CPLDs), programmable logic arrays (PLAs), and application specific integrated circuits (ASICs).

FPGA 700 includes a two-dimensional array of programmable logic array blocks (or LABs) 702 that are interconnected by a network of column and row interconnect conductors of varying length and speed. LABs 702 include multiple (e.g., 10) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 700 also includes a distributed memory structure including RAM blocks of varying sizes provided throughout the array. The RAM blocks include, for example, blocks 704, blocks 706, and block 708. These memory blocks can also include shift registers and FIFO buffers.

FPGA 700 further includes digital signal processing (DSP) blocks 710 that can implement, for example, multipliers with add or subtract features. IO blocks (IOs) 712 located, in this example, around the periphery of the chip support numerous single-ended and differential input/output standards. The IO blocks 712 contain IO buffers and are typically grouped into IO banks. It is to be understood that FPGA 700 is described herein for illustrative purposes only and that the present invention can be implemented in many different types of PLDs, CPLDs, and FPGAs.

Figure 8:
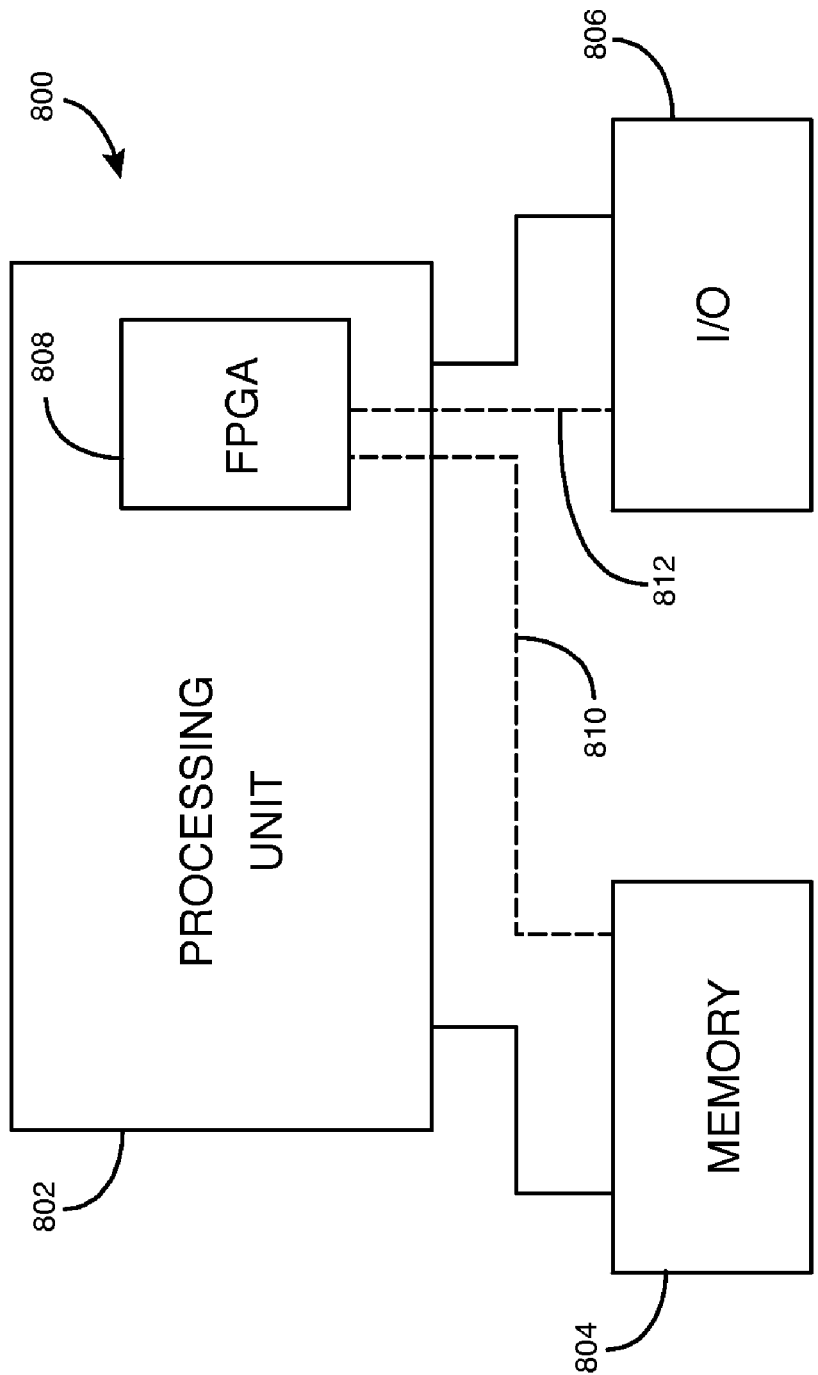
FIG. 8 is a block diagram of an electronic system that can implement embodiments of the present invention.

The present invention can also be implemented in a system that has an FPGA as one of several components. FIG. 8 shows a block diagram of an exemplary digital system 800 that can embody techniques of the present invention. System 800 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 800 can be provided on a single board, on multiple boards, or within multiple enclosures.

System 800 includes a processing unit 802, a memory unit 804 and an I/O unit 806 interconnected together by one or more buses. According to this exemplary embodiment, an FPGA 808 is embedded in processing unit 802. FPGA 808 can serve many different purposes within the system in FIG. 8. FPGA 808 can, for example, be a logical building block of processing unit 802, supporting its internal and external operations. FPGA 808 is programmed to implement the logical functions necessary to carry on its particular role in system operation. FPGA 808 can be specially coupled to memory 804 through connection 810 and to I/O unit 806 through connection 812.

Processing unit 802 can direct data to an appropriate system component for processing or storage, execute a program stored in memory 804 or receive and transmit data via I/O unit 806, or other similar function. Processing unit 802 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 808 can control the logical operations of the system. As another example, FPGA 808 acts as a reconfigurable processor, which can be reprogrammed as needed to handle a particular computing task. Alternately, FPGA 808 can itself include an embedded microprocessor. Memory unit 804 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. It is not intended to be exhaustive or to limit the present invention to the examples disclosed. A latitude of modification, various changes, and substitutions are intended in the present invention. In some instances, features of the present invention can be employed without a corresponding use of other features as set forth. Many modifications and variations are possible in light of the above teachings, without departing from the scope of the present invention. It is not intended that the scope of the present invention be limited with this detailed description.

The invention claimed is:

1. A clock switch-over circuit comprising:
   a first multiplexer that selects one of first and second clock signals as an output clock signal in response to a switch select signal received from a control circuit;
   a storage circuit that stores an enable signal in response to the output clock signal;
   a second multiplexer having an input coupled to an output of the storage circuit, wherein the second multiplexer is configurable to select the enable signal as a selected enable signal at an output of the second multiplexer;
   a logic circuit that provides the output clock signal to a clock routing network in response to the selected enable signal transmitted from the second multiplexer; and
   a third multiplexer that receives a set of clock signals and that provides the first clock signal to the first multiplexer.

2. The clock switch-over circuit defined in claim 1 wherein the enable signal is transmitted from the clock switch-over circuit to the control circuit.

3. The clock switch-over circuit defined in claim 1 further comprising:
   a fourth multiplexer that receives a set of clock signals and that provides the second clock signal to the first multiplexer;
   a fifth multiplexer that receives a set of clock signals and that provides a third clock signal to the first multiplexer; and
   a sixth multiplexer that receives a set of clock signals and that provides a fourth clock signal to the first multiplexer, wherein the first multiplexer selects one of the first, the second, the third, and the fourth clock signals as the output clock signal in response to the switch select signal.

4. A clock switch-over circuit comprising:
a first multiplexer that selects one of first and second clock signals as an output clock signal in response to a switch select signal received from a control circuit;
a first storage circuit that stores an enable signal in response to the output clock signal;
a second multiplexer having an input coupled to an output of the first storage circuit, wherein the second multiplexer is configurable to select the enable signal as a selected enable signal at an output of the second multiplexer;
a logic circuit that provides the output clock signal to a clock routing network in response to the selected enable signal transmitted from the second multiplexer; and
a second storage circuit having a first input that receives the enable signal from the output of the first storage circuit, and a second input that receives the output clock signal.

5. A clock switch-over circuit comprising:
a first multiplexer that selects one of first and second clock signals as an output clock signal in response to a switch select signal received from a control circuit;
a first storage circuit that stores an enable signal in response to the output clock signal;
a second storage circuit having a first input that receives the enable signal from an output of the first storage circuit, and a second input that receives the output clock signal;
a logic circuit that provides the output clock signal to a clock routing network in response to the enable signal; and
a second multiplexer having a first input coupled to receive an output signal of the first storage circuit, a second input coupled to receive an output signal of the second storage circuit, and an output that is coupled to an input of the logic circuit.

6. A clock switch-over circuit comprising:
a first multiplexer that selects one of first and second clock signals as an output clock signal in response to a switch select signal received from a control circuit;
a storage circuit that stores an enable signal in response to the output clock signal;
a logic circuit that provides the output clock signal to a clock routing network in response to the enable signal; and
a second multiplexer having an input coupled to receive the output clock signal from the first multiplexer, and an output coupled to provide the output clock signal to the storage circuit and the logic circuit.

7. A clock switch-over circuit comprising:
a first multiplexer that selects one of first and second clock signals as an output clock signal in response to a switch select signal received from a control circuit;
a first storage circuit that stores an enable signal at an output in response to the output clock signal;
a logic circuit that provides the output clock signal to a clock routing network in response to the enable signal;
a second multiplexer having a first input coupled to the output of the first storage circuit, and an output that is coupled to an input of the logic circuit; and
a second storage circuit having an input coupled to the output of the first storage circuit and an output coupled to a second input of the second multiplexer.

8. A clock switch-over circuit comprising:
a first multiplexer that selects one of first and second clock signals as an output clock signal in response to a switch select signal received from a control circuit;
a storage circuit that stores an enable signal in response to the output clock signal;
a second multiplexer having an input coupled to an output of the storage circuit, wherein the second multiplexer is configurable to select the enable signal as a selected enable signal at an output of the second multiplexer; and
a logic circuit that provides the output clock signal to a clock routing network in response to the selected enable signal transmitted from the second multiplexer,
wherein the clock switch-over circuit is located on a programmable logic integrated circuit, and the control circuit is configured to change a state of the switch select signal provided to the first multiplexer during a user mode of the programmable logic integrated circuit.

9. A clock switch-over circuit comprising:
a first multiplexer that selects one of first and second clock signals as an output clock signal in response to a switch select signal received from a control circuit;
a storage circuit that stores an enable signal in response to the output clock signal;
a second multiplexer having an input coupled to an output of the storage circuit, wherein the second multiplexer is configurable to select the enable signal as a selected enable signal at an output of the second multiplexer; and
a logic circuit that provides the output clock signal to a clock routing network in response to the selected enable signal transmitted from the second multiplexer, wherein the selected enable signal is transmitted from the clock switch-over circuit to the control circuit.

10. A method for switching a clock signal provided to a clock routing network using a clock switch-over circuit, the method comprising:
switching between first and second clock signals at inputs of a first multiplexer to provide an output clock signal at an output of the first multiplexer in response to a switch select signal received from a control circuit;
storing an enable signal in a first storage circuit in response to the output clock signal;
storing the enable signal in a second storage circuit in response to the output clock signal;
selecting between the enable signal transmitted from an output of the first storage circuit and the enable signal transmitted from an output of the second storage circuit to provide a selected enable signal at an output of a second multiplexer; and
providing the output clock signal to the clock routing network in response to the selected enable signal received from the output of the second multiplexer.

11. The method defined in claim 10 further comprising:
selecting the output clock signal using a third multiplexer to provide the output clock signal to the first storage circuit and to a logic circuit, wherein the logic circuit provides the output clock signal to the clock routing network in response to the selected enable signal.

12. The method defined in claim 10 wherein selecting between the enable signal transmitted from an output of the first storage circuit and the enable signal transmitted from an output of the second storage circuit to provide a selected enable signal at an output of a second multiplexer further comprises selecting between the enable signal transmitted from the output of the first storage circuit, the enable signal transmitted from the output of the second storage circuit, and the enable signal transmitted directly from the control circuit to provide the selected enable signal.

13. The method defined in claim 10 wherein providing the output clock signal to the clock routing network in response to the selected enable signal further comprises gating the output clock signal in response to the enable signal using a logic gate.

14. The method defined in claim 10 further comprising:
providing the first clock signal to a first input of the first multiplexer from a third multiplexer;
providing the second clock signal to a second input of the first multiplexer from a fourth multiplexer;
providing a third clock signal to a third input of the first multiplexer from a fifth multiplexer; and
providing a fourth clock signal to a fourth input of the first multiplexer from a sixth multiplexer, wherein the clock switch-over circuit is configured to provide one of the first, the second, the third, and the fourth clock signals to the clock routing network.

15. The method defined in claim 10 wherein the selected enable signal is transmitted from the clock switch-over circuit to the control circuit.

16. The method defined in claim 10 wherein the clock switch-over circuit is located on a programmable logic integrated circuit, and switching between the first and the second clock signals further comprises switching between the first and the second clock signals in response to the switch select signal during a user mode of the programmable logic integrated circuit.

17. The method defined in claim 10 wherein storing the enable signal in a first storage circuit in response to the output clock signal further comprises synchronizing the enable signal with the output clock signal to prevent glitches on the clock routing network.

18. A method for switching a clock signal provided to a clock routing network using a clock switch-over circuit, the method comprising:
selecting a first clock signal as a currently selected clock signal using a first multiplexer;
storing a state of an enable signal in a first storage circuit;
selecting the enable signal as a selected enable signal using a second multiplexer and providing the selected enable signal to a logic circuit;
providing the first clock signal to the clock routing network in response to the selected enable signal using the logic circuit;
selecting a second clock signal as the currently selected clock signal using the first multiplexer in response to a switch select signal from a control circuit;
preventing the second clock signal from being provided to the clock routing network for a period of time after the second clock signal is selected; and
providing the second clock signal to the clock routing network in response to the selected enable signal using the logic circuit.

19. The method defined in claim 18 wherein preventing the second clock signal from being provided to the clock routing network for the period of time after the second clock signal is selected further comprises:
transmitting the state of the enable signal from an output of the first storage circuit to an input of a second storage circuit; and
storing the state of the enable signal at an output of the second storage circuit in response to the currently selected clock signal.

20. The method defined in claim 19 wherein providing the second clock signal to the clock routing network in response to the selected enable signal using the logic circuit further comprises providing the second clock signal to the clock routing network in response to the state of the enable signal stored in one of the first and the second storage circuits.

21. The method defined in claim 18 wherein selecting the enable signal as a selected enable signal using a second multiplexer and providing the selected enable signal to a logic circuit further comprises selecting between the enable signal stored at an output of the first storage circuit and the enable signal transmitted directly from the control circuit as the selected enable signal.

22. The method defined in claim 18 further comprising:
storing a state of the enable signal in a second storage circuit in response to the currently selected clock signal,
wherein selecting the enable signal as a selected enable signal using a second multiplexer and providing the selected enable signal to a logic circuit further comprises selecting between the enable signal stored at an output of the first storage circuit and the enable signal stored at an output of the second storage circuit as the selected enable signal.

* * * * *